United States Patent

Jung

(10) Patent No.: US 9,897,198 B2
(45) Date of Patent: Feb. 20, 2018

(54) APPARATUS FOR CALCULATING FILLING TIME OF AUTOMATIC TRANSMISSION AND CONTROL METHOD THEREOF

(71) Applicant: Hyundai Autron Co., Ltd., Seongnam-si (KR)

(72) Inventor: Sung Wook Jung, Suwon-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 0 days.

(21) Appl. No.: 15/298,036

(22) Filed: Oct. 19, 2016

(65) Prior Publication Data

US 2017/0114888 A1    Apr. 27, 2017

(30) Foreign Application Priority Data

Oct. 21, 2015    (KR) .................. 10-2015-0146439

(51) Int. Cl.
*F16H 59/72*    (2006.01)
*F16H 61/02*    (2006.01)
*F16H 61/06*    (2006.01)

(52) U.S. Cl.
CPC .......... *F16H 61/0204* (2013.01); *F16H 59/72* (2013.01); *F16H 61/061* (2013.01); *F16H 2061/062* (2013.01)

(58) Field of Classification Search
None
See application file for complete search history.

(56) References Cited

U.S. PATENT DOCUMENTS

| 4,982,620 | A | * | 1/1991 | Holbrook | F16H 61/061 |
| | | | | | 192/3.3 |
| 5,029,492 | A | * | 7/1991 | Kiuchi | B60W 10/06 |
| | | | | | 477/101 |
| 5,035,312 | A | * | 7/1991 | Asayama | F16D 48/062 |
| | | | | | 137/486 |

(Continued)

FOREIGN PATENT DOCUMENTS

| JP | 10-141486 A | 5/1998 |
| JP | 2001-336621 A | 12/2001 |

(Continued)

*Primary Examiner* — Dirk Wright
(74) *Attorney, Agent, or Firm* — Morgan, Lewis & Bockius LLP

(57) ABSTRACT

An apparatus for calculating a filling time in an automatic transmission and a method thereof are disclosed. The apparatus includes an oil temperature detection unit for detecting an oil temperature of a transmission oil, a control duty input unit for receiving a control duty for controlling a solenoid valve that discharges or fills the transmission oil supplied from an oil pump from or to an oil flow path corresponding to a gear shifting stage to form a hydraulic pressure, a storage unit for storing a filling time table in which a relationship between a remaining flow and a filling time according to the oil temperature is mapped, and a calculation control unit for receiving the control duty of the solenoid valve from the control duty input unit to calculate the remaining flow on the basis of a variation interval of the remaining flow and an elapsed time, and calculating the filling time depending on the filling time table stored in the storage unit on the basis of the remaining flow.

8 Claims, 3 Drawing Sheets

(56) References Cited

U.S. PATENT DOCUMENTS

| | | | | |
|---|---|---|---|---|
| 5,088,353 | A * | 2/1992 | Yoshida | F16H 61/12 477/117 |
| 5,216,606 | A * | 6/1993 | Lentz | F16H 61/061 477/154 |
| 5,282,401 | A * | 2/1994 | Hebbale | F16H 61/061 475/123 |
| 5,551,930 | A * | 9/1996 | Creger | F16H 61/08 475/123 |
| 7,181,327 | B2 * | 2/2007 | Lee | F16H 61/061 477/166 |
| 8,066,620 | B2 * | 11/2011 | Sah | B60K 6/365 477/175 |
| 9,033,852 | B2 * | 5/2015 | Horiike | B60W 10/023 477/61 |

FOREIGN PATENT DOCUMENTS

| | | |
|---|---|---|
| KR | 10-2001-0059252 A | 7/2001 |
| KR | 10-2002-0054187 A | 7/2002 |
| KR | 10-0350147 B1 | 8/2002 |
| KR | 10-2013-0002575 A | 1/2013 |

* cited by examiner

APPARATUS FOR CALCULATING FILLING TIME OF AUTOMATIC TRANSMISSION AND CONTROL METHOD THEREOF

CROSS-REFERENCE TO RELATED APPLICATION

The present application claims priority under 35 U.S.C 119(a) to Korean Application No. 10-2015-0146439, filed on Oct. 21, 2015, which is herein incorporated by reference in its entirety.

BACKGROUND

Technical Field

Various embodiments of the present disclosure relate to an automatic transmission of a vehicle, and more particularly, to an apparatus for calculating a filling time of an automatic transmission, which calculates a remaining flow on the basis of a control duty of a solenoid valve and an elapsed time in a gear shift situation of the automatic transmission to calculate a proper filling time required for the gear shift.

Related Art

In general, a vehicle having an automatic transmission installed therein allows a shift gear of a target shift stage to be operated by controlling the hydraulic pressure within a gear shifting range set according to a running speed of the vehicle.

Therefore, the vehicle controls a rotation force of a fluid by operating a torque converter according to the output power of an engine, and allows the shifting operation to be made by the hydraulic pressure applied to the corresponding valve by a control signal applied from a shift control device and the corresponding gear to be operated according to a driving condition of the vehicle.

Accordingly, since the vehicle having the automatic transmission installed therein, of which operation state is controlled according to the hydraulic pressure, does not need an operation of a clutch pedal for blocking the power to change the operation state of the corresponding transmission gear, it is possible to reduce the driver's driving fatigue. Also, since an engine stall due to a malfunction or driving immaturity of the driver does not occur, even a beginner can easily drive.

Therefore, a port changing is made depending on a selected position of a gear shift lever of a driver and a hydraulic pressure from an oil pump is provided to the automatic transmission, and an operation condition of a hydraulic pressure valve is changed by the hydraulic pressure, thereby controlling the operation condition of the hydraulic pressure friction component for selecting the gear shift from the gear stages of shift gear mechanism.

Accordingly, the operation of the oil gear device is changed according to a selective operation of the friction component composed of the clutch or break, a proper shifting is performed, and the power is transmitted to a drive gear.

In addition, when the shifted power is transmitted to the drive gear, the shifted power is transmitted to the drive gear and a driven gear teeth coupled to a reduction gear by the drive gear, thereby controlling a rotation operation of wheels.

As such, when a target shift stage is determined according to the driving condition of the vehicle and a control operation to the determined target shift stage is operated, a corresponding friction component among friction components including a clutch, a break, or the like is performed for each target shift stage.

The related art of the present disclosure is disclosed in Korean Patent Registration No. 10-0350147 registered on Aug. 27, 2002 and entitled "Method for controlling transmission of automatic transmission for vehicle".

SUMMARY

Various embodiments are directed to an apparatus for calculating a filling time of an automatic transmission and a control method therefor.

According to an embodiment, an apparatus for calculating a filling time of an automatic transmission may include an oil temperature detection unit for detecting an oil temperature of a transmission oil; a control duty input unit for receiving a control duty for controlling a solenoid valve that discharges or fills the transmission oil supplied from an oil pump from or to an oil flow path corresponding to a gear shifting stage to form a hydraulic pressure; a storage unit for storing a filling time table in which a relationship between a remaining flow and a filling time according to the oil temperature is mapped; and a calculation control unit for receiving the control duty of the solenoid valve from the control duty input unit to calculate the remaining flow on the basis of a variation interval of the remaining flow and an elapsed time, and calculating the filling time depending on the filling time table stored in the storage unit on the basis of the remaining flow.

The variation interval of the remaining flow may include at least one of an interval in which the remaining flow is decreased, an interval in which the remaining flow is increased, and an interval in which the remaining flow is maintained.

If the setting time has elapsed after the control duty enters the variation interval of the remaining flow, the calculation control unit may calculate the remaining flow by adding or subtracting a setting flow to or from the previous remaining flow.

The setting time and the setting flow may be determined depending on the oil temperature and the control duty.

According to another embodiment, a control method for an apparatus for calculating a filling time of an automatic transmission may include receiving a control duty for controlling a solenoid valve from a control duty input unit and an oil temperature of a transmission oil from an oil temperature detection unit, respectively, by a calculation control unit; determining a variation interval in which a remaining flow is included for the control duty, and measuring an elapsed time after the control duty enters the determined variation interval, by the calculation control unit; calculating the remaining flow on the basis of the variation interval of the remaining flow according to the control duty and the elapsed time, by the calculation control unit; and calculating a filling time according to a filling time table stored in a storage unit on the basis of the remaining flow, by the calculation control unit.

In the determining a variation interval in which a remaining flow is included, the variation interval of the remaining flow may include at least one of an interval in which the remaining flow is decreased, an interval in which the remaining flow is increased, and an interval in which the remaining flow is maintained.

In calculating the remaining flow, if the setting time has elapsed after the control duty enters the variation interval of the remaining flow, the calculation control unit may calculate the remaining flow by adding or subtracting the setting flow to or from the previous remaining flow.

The setting time and the setting flow may be determined depending on the oil temperature and the control duty.

BRIEF DESCRIPTION OF THE DRAWINGS

Various embodiments of an inventive concept will become more apparent in view of the attached drawings and accompanying detailed description, in which.

DETAILED DESCRIPTION OF THE EMBODIMENTS

Embodiments of the present disclosure will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

In recent, while the shift stage of the automatic transmission is increased, the gear shift occurs frequently in accordance with a running condition of the vehicle, and thus, control members are combined on/off repeatedly in a short period of time. In this case, as the filling hydraulic pressure is overlapped in a short period of time, for example, at a time of power-on up shift, if the hydraulic pressure of an apply side is quickly supplied before the hydraulic pressure of a release side is discharged, an interlock occurs momentarily in the interior of the automatic transmission during the power-on up shift, therefore, the driver becomes to feel the shift shock.

The present disclosure is proposed to solve the above-described problems, and provides an apparatus for calculating a filling time in an automatic transmission, which calculates a remaining flow on the basis of a control duty of a solenoid valve and a time elapsed in a gear shift situation of the automatic transmission to calculate a proper filling time required for the gear shift, and a control method thereof.

Figure 1:
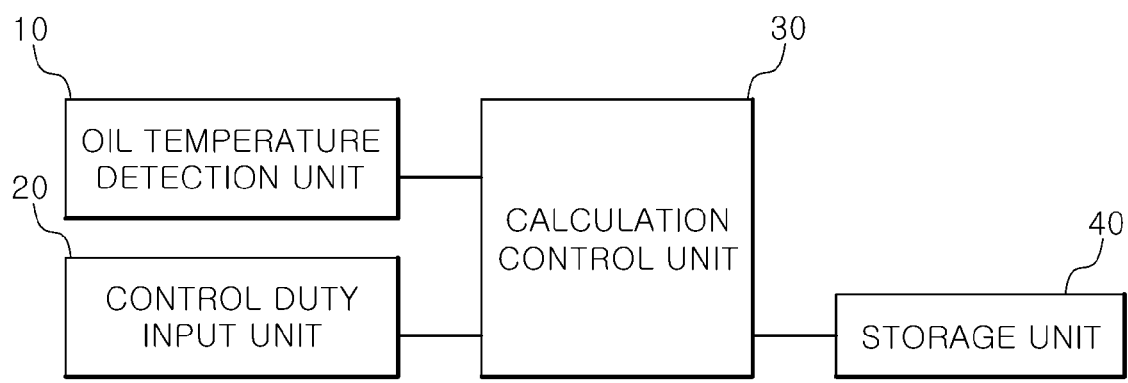
FIG. 1 is a block diagram illustrating a configuration of an apparatus for calculating a filling time of an automatic transmission according to an embodiment of the present disclosure.
Figure 2:
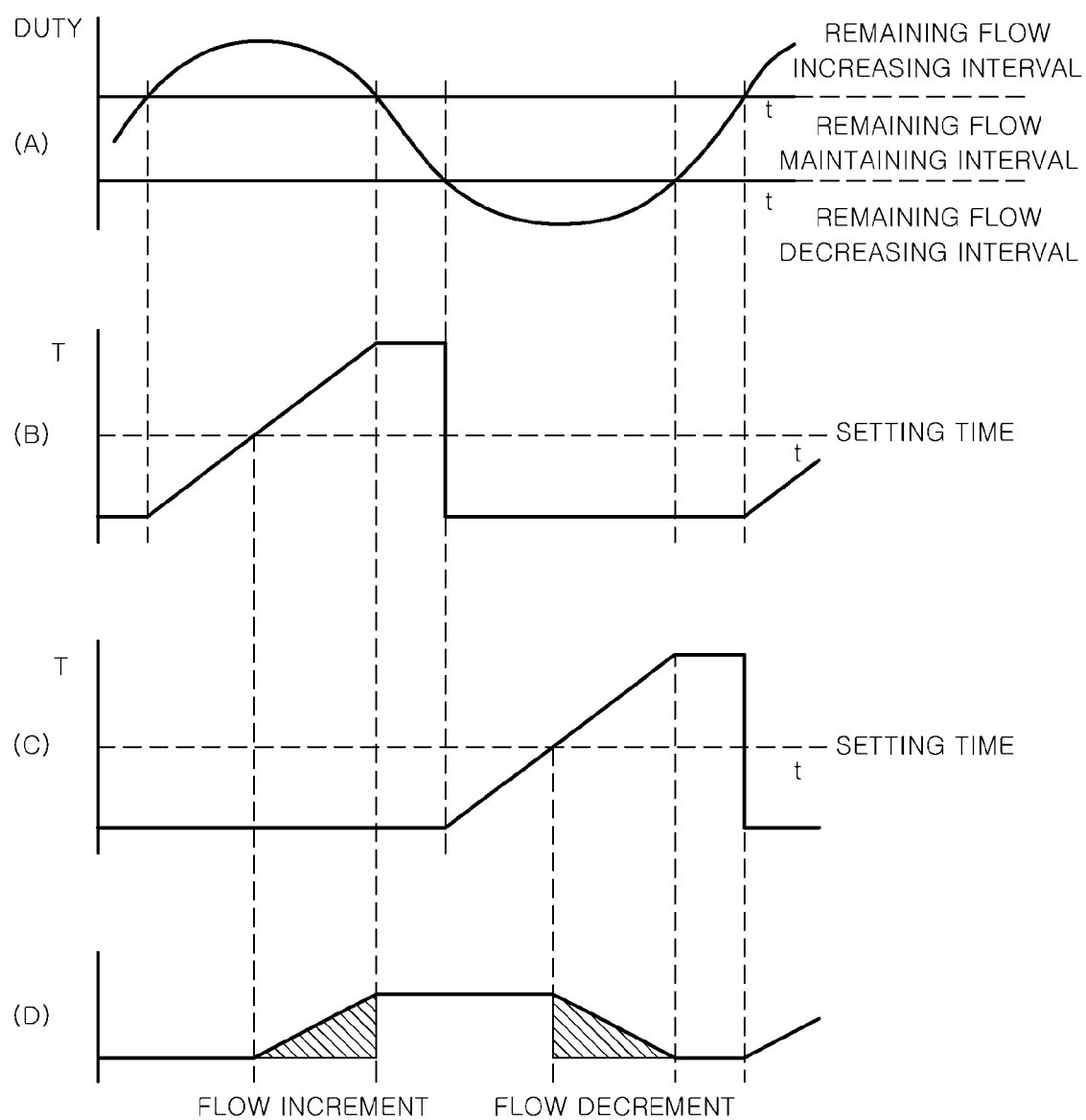
FIG. 2 are graphs illustrating the increase/decrease of a remaining flow according to a control duty, a variation interval, and an elapsed time of the remaining flow in an apparatus for calculating a filling time of an automatic transmission according to an embodiment of the present disclosure.

FIG. 1 is a block diagram illustrating a configuration of an apparatus for calculating a filling time of an automatic transmission according to an embodiment of the present disclosure. FIG. 2 are graphs illustrating the increase/decrease of a remaining flow according to a control duty, a variation interval, and a time elapsed of the remaining flow in an apparatus for calculating a filling time of an automatic transmission according to an embodiment of the present disclosure.

In FIG. 2, (A) is a graph showing a variation interval of the remaining flow for the control duty, (B) is a graph showing a remaining flow increasing time measured by a remaining flow increasing timer, (C) is a graph showing a remaining flow decreasing time measured by a remaining flow decreasing timer, and (D) is a graph showing a modeled remaining flow.

As illustrated in FIGS. 1 and 2, the apparatus for calculating a filling time of an automatic transmission may include an oil temperature detection unit 10, a control duty input unit 20, a storage unit 40, and a calculation control unit 30.

The oil temperature detection unit 10 detects the oil temperature of a transmission oil and provides the detected oil temperature to the calculation control unit 30.

Since the viscosity of the transmission oil is dependent on the oil temperature, the fluid flow rate or time may vary when providing or discharging the transmission oil into or from an oil flow path. Accordingly, the filling time according to the oil temperature can be calculated by detecting the oil temperature of the transmission oil in order to reflect the variation factors.

The control duty input unit 20 receives the control duty for controlling a solenoid valve (not shown) from the shifting control device (not shown). Wherein the solenoid valve discharges or fills the transmission oil supplied from an oil pump (not shown) from or to the oil flow path corresponding to the shift stage to form a hydraulic pressure.

The storage unit 40 stores a filling time table in which a relationship between the remaining flow and the filling time according to the oil temperature is mapped.

The calculation control unit 30, in a gear shifting situation, receives the control duty of the solenoid valve (not shown) from the control duty input unit 20 to calculate the remaining flow on the basis of a variation interval of the remaining flow and an elapsed time, and calculates the filling time according to the filling time table stored in the storage unit 40 on the basis of the remaining flow.

Here, the variation interval of the remaining flow may be divided into an interval in which the remaining flow is decreased, an interval in which the remaining flow is increased, and an interval in which the remaining flow is maintained depending on the control duty, as shown in graph (A) of FIG. 2.

Accordingly, the calculation control unit 30 measures the elapsed time after the control duty enters the variation interval of the remaining flow, and if the setting time has elapsed, the setting flow is added or subtracted to or from a previous remaining flow (that is a previous value of the remaining flow) to calculate the remaining flow.

In other words, as shown in graph (B) of FIG. 2, if the setting time has been elapsed after the control duty enters the interval in which the remaining flow is increased, the setting flow is added to the previous remaining flow to calculate the remaining flow.

In addition, as shown in graph (C) of FIG. 2, if the setting time set by a remaining flow decreasing timer after the control duty enters the remaining flow decreasing interval, the setting flow is subtracted from the previous remaining flow to calculate the remaining flow.

Accordingly, the remaining flow can be calculated by reflecting the remaining flow increment and the remaining flow decrement, as shown in graph (D) of FIG. 2.

The setting time for comparing the elapsed time after the control duty enters the variation interval of the remaining flow, and the setting flow for adding or subtracting to or from the remaining flow when the time setting has elapsed may be determined depending on the oil temperature and the control duty, respectively.

As described above, according to the apparatus for controlling a filling time of an automatic transmission according to an embodiment of the present disclosure, in a gear shift situation of the automatic transmission, the remaining flow may be calculated in all gear shifting situations on the basis of the control duty of the solenoid valve and the elapsed time, thereby calculating a proper filling time for the required gear shift. Accordingly, even the gear shift occurs repeatedly during a short time, the gear shift feeling and the gear shift performance can be improved.

Figure 3:
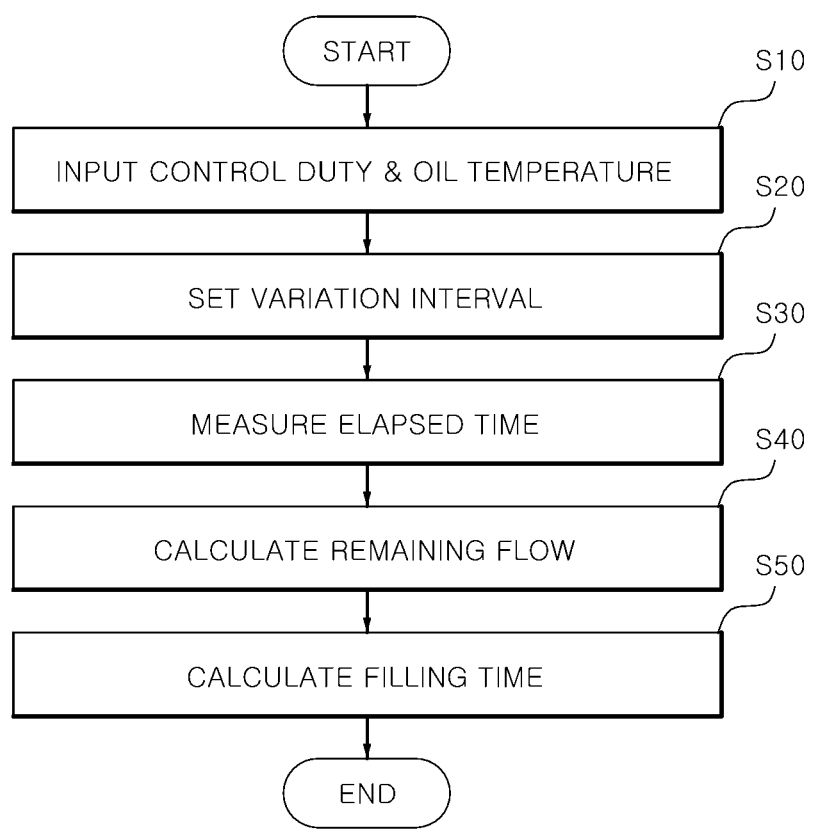
FIG. 3 is a flow chart for explaining a control method of an apparatus for calculating a filling time of an automatic transmission according to an embodiment of the present disclosure.

FIG. 3 is a flow chart for explaining a control method for an apparatus for calculating a filling time of an automatic transmission according to an embodiment of the present disclosure.

Referring to FIG. 3, firstly, the calculation control unit 30 receives a control duty for controlling a solenoid valve (not shown) from a control duty input unit 20, and receives the oil temperature of a transmission oil from an oil temperature detection unit 10 (S10).

The control duty is a control signal for controlling the solenoid valve (not shown) that discharges or fills the transmission oil supplied from an oil pump (not shown) to an oil flow path corresponding to a gear shifting stage in a shifting control device (not shown) to form a hydraulic pressure.

Since the viscosity of the transmission oil varies depending on the oil temperature, the flow rate and required time may vary when providing or discharging the transmission oil to or from the oil flow path. Accordingly, the calculation control unit 30 receives the oil temperature of the transmission oil in order to reflect the variation factors.

The calculation control unit 30 determines the variation interval in which the remaining flow is included with respect to the control duty inputted in operation S10 (S20).

In other words, the operation control unit 30, as shown in graph (A) of FIG. 2, determines that the control duty is included in any variation interval among an interval in which the remaining flow is increased, an interval in which the remaining flow is decreased, and an interval in which the remaining flow is maintained.

After determining the variation interval in which the control duty is included in operation S20, the calculation control unit 30 measures the elapsed time after the control duty enters the determined variation interval (S30).

If the setting time has elapsed after the control duty enters the variation interval in operation S30, the calculation control unit 30 calculates the remaining flow by adding or subtracting the setting flow to or from the previous remaining flow (S40).

In other words, as shown in graph (B) of FIG. 2, after the control duty enters the remaining flow increasing interval, if the setting time set by a remaining flow increasing timer has elapsed, the calculation control unit 30 calculates the remaining flow by adding the setting flow to the previous remaining flow.

Further, as shown in graph (C) of FIG. 2, after the control duty enters the remaining flow decreasing interval, if the setting time set by a remaining flow decreasing timer has elapsed, the calculation control unit 30 calculates the remaining flow by subtracting the setting flow from the previous remaining flow.

Accordingly, the remaining flow may be represented to reflect the remaining flow increment and the remaining flow decrement, as shown in graph (D) of FIG. 2.

Here, the setting time for comparing the elapsed time after the control duty enters the variation interval of the remaining flow, and the setting flow for adding or subtracting to or from the remaining flow when the setting time has elapsed may be determined by the oil temperature and control duty, respectively.

After calculating the remaining flow in operation S40, the calculation control unit 30 calculates the filling time according to a filling time table stored in the storage unit 40 on the basis of the remaining flow (S50).

The filling time table may be defined by mapping a relationship between the remaining flow and the filling time depending on the oil temperature. Accordingly, the filling time may be calculated according to the remaining flow and the current oil temperature.

As described above, according to the control method for an apparatus for calculating a filling time of an automatic transmission according to an embodiment of the present disclosure, in a gear shifting situation of the automatic transmission, the remaining flow may be calculated in all gear shifting situations on the basis of the control duty of the solenoid valve and the elapsed time, thereby calculating a proper filling time for the required gear shift. Accordingly, even the gear shift occurs repeatedly during a short time, the gear shift feeling and the gear shift performance can be improved.

The embodiments of the inventive concept have been disclosed above for illustrative purposes. Those of ordinary skill in the art will appreciate that various modifications, additions and substitutions are possible, without departing from the scope and spirit of the inventive concept as disclosed in the accompanying claims.

What is claimed is:

1. An apparatus for calculating a filling time of an automatic transmission, comprising:
   an oil temperature detection unit for detecting an oil temperature of a transmission oil;
   a control duty input unit for receiving a control duty for controlling a solenoid valve that discharges or fills the transmission oil supplied from an oil pump from or to an oil flow path corresponding to a gear shifting stage to form a hydraulic pressure;
   a storage unit for storing a filling time table in which a relationship between a remaining flow and a filling time according to the oil temperature is mapped; and
   a calculation control unit for receiving the control duty of the solenoid valve from the control duty input unit to calculate the remaining flow on the basis of a variation interval of the remaining flow and an elapsed time, and calculating the filling time depending on the filling time table stored in the storage unit on the basis of the remaining flow.

2. The apparatus of claim 1, wherein the variation interval of the remaining flow includes at least one of an interval in which the remaining flow is decreased, an interval in which the remaining flow is increased, and an interval in which the remaining flow is maintained.

3. The apparatus of claim 1, wherein if the setting time has elapsed after the control duty enters the variation interval of the remaining flow, the calculation control unit calculates the remaining flow by adding or subtracting a setting flow to or from a previous remaining flow.

4. The apparatus of claim 3, wherein the setting time and the setting flow are determined depending on the oil temperature and the control duty.

5. A control method for an apparatus for calculating a filling time of an automatic transmission, comprising:
   receiving a control duty for controlling a solenoid valve from a control duty input unit and an oil temperature of a transmission oil from an oil temperature detection unit, respectively, by a calculation control unit;

determining a variation interval in which a remaining flow is included for the control duty, and measuring an elapsed time after the control duty enters the determined variation interval, by the calculation control unit;

calculating the remaining flow on the basis of the variation interval of the remaining flow according to the control duty and the elapsed time, by the calculation control unit; and calculating a filling time according to a filling time table stored in a storage unit on the basis of the remaining flow, by the calculation control unit.

6. The method of claim 5, wherein in the determining a variation interval in which a remaining flow is included, the variation interval of the remaining flow includes at least one of an interval in which the remaining flow is decreased, an interval in which the remaining flow is increased, and an interval in which the remaining flow is maintained.

7. The method of claim 5, wherein in calculating the remaining flow, if the setting time has elapsed after the control duty enters the variation interval of the remaining flow, the calculation control unit calculates the remaining flow by adding or subtracting the setting flow to or from the previous remaining flow.

8. The method of claim 7, wherein the setting time and the setting flow are determined depending on the oil temperature and the control duty.

* * * * *